United States Patent [19]

Sowa

[11] Patent Number: 4,809,159
[45] Date of Patent: Feb. 28, 1989

[54] CONTROL TOKEN MECHANISM FOR SEQUENCE DEPENDENT INSTRUCTION EXECUTION IN A MULTIPROCESSOR

[75] Inventor: Masahiro Sowa, Gunma, Japan

[73] Assignee: Omron Tateisi Electronics Co., Kyoto, Japan

[21] Appl. No.: 147,128

[22] Filed: Jan. 21, 1988

Related U.S. Application Data

[63] Continuation of Ser. No. 693,623, Jan. 22, 1985, abandoned, which is a continuation-in-part of Ser. No. 578,875, Feb. 10, 1984, abandoned.

[30] Foreign Application Priority Data

Feb. 10, 1983 [JP] Japan .................................. 58-20863

[51] Int. Cl.⁴ ........................ G06F 13/00; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,051,551 | 9/1977 | Lawrie et al. | 364/200 |
| 4,228,496 | 10/1980 | Katzman et al. | 364/200 |
| 4,387,427 | 6/1983 | Cox et al. | 364/200 |
| 4,394,727 | 7/1983 | Hoffman et al. | 364/200 |
| 4,414,624 | 11/1983 | Summir, Jr. et al. | 364/200 |
| 4,491,937 | 1/1985 | Chan | 365/154 |
| 4,525,778 | 6/1985 | Cane | 364/200 |
| 4,553,203 | 11/1985 | Ran et al. | 364/200 |

OTHER PUBLICATIONS

Sowa, "Control Flow Parallel Computer Architecture", pp. 1–4, Gumma University, Japan, 3/18/83.
Sowa et al., "Design of Assembly Level Language for Control Flow Parallel Computer", pp. 1–9, Gumma University, Japan, 1/20/84.
Sowa, "Control Flow Parallel Computer", Department of Computer Science, Gumma University, Japan, pp. 1–16, w/translation, 1984.
Treleaven et al, "Combining Data Flow and Control Flow Computing", The Computer Journal, vol. 25, No. 2, 1982.

Primary Examiner—Gary V. Harkcom
Assistant Examiner—Christopher H. Lynt
Attorney, Agent, or Firm—Foley & Lardner, Schwartz, Jeffery, Schwaab, Mack, Blumenthal & Evans

[57] ABSTRACT

A controlled flow parallel computer incorporating a node drive register which designates the location of executable instructions. The node drive register allows instructions to be executed concurrently and non-deterministically without a complex control.

Control token locations in the node drive register associated with a given instruction are filled upon the completion of a prior instruction required to be executed before executing that instruction. The instruction is ready for execution once the control token locations are filled.

14 Claims, 3 Drawing Sheets

FIRABLE NODE
START OF FIRING

DURING THE COMPUTATION

COMPLETION OF THE COMPUTATION

COMPLETION OF THE FIRING

DATA ADDRESS OR DESTINATION NODE POINTER

FIG. 9(a).
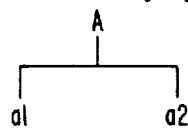
FIG. 9(b).
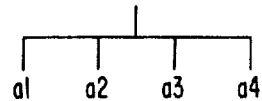
FIG. 9(c).
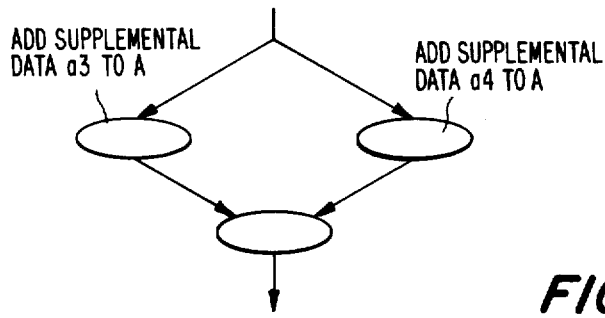
FIG. 9(d).
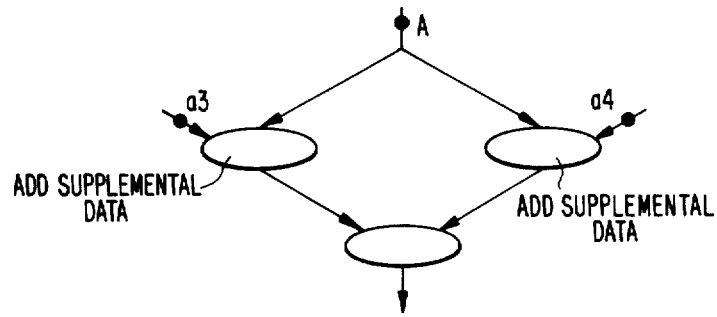
FIG. 10(a).
$$\begin{cases} x := a * b \\ y := b * c \\ z := a - b \\ q := x + y \\ d := q * z \end{cases} \Longrightarrow$$
FIG. 10(b).
```
NODE  INSTRUCTION   DESTINATION
N0    start,        N1.1, N2.1, N3.1
N1    x := a * b,   N4.1
N2    y := b * c,   N4.2
N3    z := a - b,   N5.2
N4    q := x + y,   N5.1
N5    d := q * z
```

| OPCODE | LOS | ROS | RS | ND | DS1 | DS2 |
|---|---|---|---|---|---|---|
| DS3 | DS4 | DS5 | DS6 | DS7 | | |
| LEFT OPERAND ||||||||
| RIGHT OPERAND ||||||||
| RESULT ||||||||
| DESTINATION 1 ||||||||
| DESTINATION 2 ||||||||
| : ||||||||
| DESTINATION 7 ||||||||

| SN1 | ? | ? | ? | ? | ? |
|---|---|---|---|---|---|

| I | ENT | WCA |
|---|---|---|

| 0 | AT | NCTN | WCT | | |
|---|---|---|---|---|---|

| 1 | TRIGGER | | 2,3 |
|---|---|---|---|
| 2 | ADD | A,B,C | 4,5 |
| 3 | SUB | A,B,D | 4,5 |
| 4 | ADD | C,D,E | ? |
| 5 | SUB | C,D,F | ? |

| LABEL | OPERATION CODE | LEFT OPERAND, RIGHT OPERAND, RESULT | DEST. 1, DEST. 2, ..., DEST. n |
|---|---|---|---|

| LABEL | OAS | BOOLEAN-VALUED VARIABLE | TRUE-DEST./FALSE-DEST. |
|---|---|---|---|

NAME    SUBROUTINE    ARG1, ARG2, ..., ARGn

[BODY OF SUBROUTINE]

ENDS

FIG. 19.

LEGEND:
- [EA] - EFFECTIVE ADDRESS
- 1 BYTE - 16 BITS
- 1 WORD - 2 BYTES
- 1 LONG WORD - 2 WORDS

I. DATA MOVEMENT OPERATIONS
  1. MOVE [EA],[EA]
     THE SIZE OF THE OPERAND MAY BE SPECIFIED TO BE BYTE, WORD OR LONG AS ILLUSTRATED
     SUBSEQUENTLY: MOVE.B, MOVE.W, MOVE.L
     MOVEC [EA],[EA],[EA]
     THE NUMBER OF BYTES TO BE MOVED IS ALWAYS 1 MORE THAN WHAT IS INDICATED IN THE
     THIRD [EA] WHICH IS 1-BYTE LONG.
     MOVEI #[DATA],[EA]
     THE SIZE OF THE IMMEDIATE DATA MATCHES THE OPERATION SIZE.
  2. EXG [EA],[EA]
  3. SWAP[EA],[EA]

II. INTEGER ARITHMETIC OPERATIONS
  1. ADD [EA],[EA],[EA]
     ADDI [EA], #[DATA],[EA]
     ADDI #[DATA],[EA],[EA]
  3. MULS [EA],[EA],[EA]
     MULU [EA],[EA],[EA]
  5. INCR1 [EA],[EA]
     INCR2 [EA],[EA]
     INCR4 [EA],[EA]
  7. NEG [EA],[EA]

2. SUB [EA],[EA],[EA]
     SUBI [EA], #[DATA],[EA]
     SUBI #[DATA],[EA],[EA]
  4. DIVS [EA],[EA],[EA]
     DIVU [EA],[EA],[EA]
  6. DECR1 [EA],[EA]
     DECR2 [EA],[EA]
     DECR4 [EA],[EA]

III. MULTIPRECISION ARITHMETIC OPERATIONS
  1. ADDR [EA],[EA],[EA]
     ADDRD [EA],[EA],[EA]
  3. MULR [EA],[EA],[EA]
     MULRD [EA],[EA],[EA]

2. SUBR [EA],[EA],[EA]
     SUBRD [EA],[EA],[EA]
  4. DIVR [EA],[EA],[EA]
     DIVRD [EA],[EA],[EA]

IV. LOGICAL OPERATIONS
  1. AND [EA],[EA],[EA]
     ANDI [EA], #[DATA],[EA]
     ANDI #[DATA],[EA],[EA]
  3. EOR [EA],[EA],[EA]
     EORI [EA], #[DATA],[EA]
     EORI #[DATA],[EA],[EA]

2. OR [EA],[EA],[EA]
     ORI [EA], #[DATA],[EA]
     ORI #[DATA],[EA],[EA]
  4. NOT [EA],[EA]

V. SHIFT AND ROTATE OPERATIONS
  1. ASL [EA],[EA],[EA]
     ASR [EA],[EA],[EA]
     LSL [EA],[EA],[EA]
     LSR [EA],[EA],[EA]
     ROL [EA],[EA],[EA]
     ROR [EA],[EA],[EA]

2. ASLI [EA],#[DATA],[EA]
     ASRI [EA],#[DATA],[EA]
     LSLI [EA],#[DATA],[EA]
     LSRI [EA],#[DATA],[EA]
     ROLI [EA],#[DATA],[EA]
     RORI [EA],#[DATA],[EA]

VI. COMPARE OPERATIONS
  1. EQ [EA],[EA],[EA]
     GE [EA],[EA],[EA]
     GT [EA],[EA],[EA]
     LE [EA],[EA],[EA]
     LT [EA],[EA],[EA]

2. EQI [EA],#[DATA],[EA]
     EQI #[DATA],[EA],[EA]
     GEI [EA],#[DATA],[EA]
     GEI #[DATA],[EA],[EA]
     LEI [EA],#[DATA],[EA]
     LEI #[DATA],[EA],[EA]
     LTI [EA],#[DATA],[EA]
     LTI #[DATA],[EA],[EA]

VII. BIT OPERATIONS
  1. BTEST [EA],[EA],[EA]
     BTESTI #[DATA],[EA],[EA]
     BSET [EA],[EA],[EA]
     BSETI #[DATA],[EA],[EA]
     BCLR [EA],[EA],[EA]
     BCLRI #[DATA],[EA],[EA]

CONTROL TOKEN MECHANISM FOR SEQUENCE DEPENDENT INSTRUCTION EXECUTION IN A MULTIPROCESSOR

CROSS REFERENCE TO RELATED APPLICATIONS

This application is a continuation of application Ser. No. 693,623, filed Jan. 22, 1985, now abandoned, which in turn is a continuation-in-part of Ser. No. 578,875, filed Feb. 10, 1984, now abandoned.

BACKGROUND OF THE INVENTION

The present invention relates to a control flow parallel computer system.

Various data flow computer architectures have been proposed which are designed and suited for parallel processing. However, these architectures suffer shortcoming such as complexity of the interconnection network and the control circuit.

SUMMARY OF THE INVENTION

An object of the present invention is to provide a control flow parallel computer system including a plurality of processors which are capable of executing control flow parallel processing concurrently and nondeterministically using simplified hardware structure which does not involve complicated control and interconnections.

It is another object of the present invention to provide a control flow parallel computer system for performing processing in accordance with a flow of tokens which are referred to as the control tokens and designate executable instructions.

In recent years a number of research groups have proposed various data flow computer architectures suitable for parallel processing. In contrast to these, the control flow parallel computer (CFPC) of the present invention employs the concept of control flow used in a conventional stored program serial computer (CSPSC). What makes the CFPC different is the use of a so-called NODE DRIVE REGISTER (NDR). The NDR, corresponding to the program counter of CSPSC, stores LINKAGEs and CONTROL TOKENs (CTs) for indicating, location(s) of executable instruction(s) and completion of the preceding instruction(s), respectively. The presence of the NDR makes it possible for processors to execute instructions concurrently and nondeterministically. The CFPC can also execute data flow programs because data flow processing is nothing but a data-restricted control processing. The NDR is relatively small in size because the control tokens occupy space in the NDR for a very short transient period and one control token can be constructed from one bit. The small scale NDR results in simplicity of the interconnection network and the control circuit. A method to reduce the complexity of a multi-port main memory is also described.

BRIEF DESCRIPTION OF THE DRAWINGS

The above and other objects of the present invention will become more readily apparent as the invention becomes more clearly understood from the detailed description to follow, reference being had to the accompanying drawings in which like reference numerals represent like parts throughout, and in which:

FIGS. 9(a)–9(d) show a comparison of control flow operations to data flow operation;

FIGS. 10(a) and 10(b) show the transformation of a single assignment data flow program to a control flow program;

FIG. 19 shows an instruction set summary which can be used in control flow programming;

DETAILED DESCRIPTION OF THE PREFERRED EMBODIMENTS

A control flow program consists of nodes, arcs and control tokens. Instructions associated with the nodes are executed as control tokens flow along arcs according to the firing rules as shown in FIG. 1(a)–FIG. 1(d). A node may fire whenever a control token is present on each of its incoming arcs (FIG. 1 (a)). When a node fires one control token is removed from each of its incoming arcs. As a replacement, a new token called SHELL TOKEN (ST) is put on each arc (FIG. 1(b)) collectively. A control token is placed on each of the outgoing arcs after the completion of the instruction or the function (f) execution (FIG. 1(c)). Then the shell token on each of the incoming arcs is removed (FIG. 1(d)). If it is impossible to place the control token on any outgoing arc because of too many tokens on it, STs are still removed from every incoming arc and a so-called RESULT TOKEN (RT) is put on it, as will be described below.

Figure 1A:
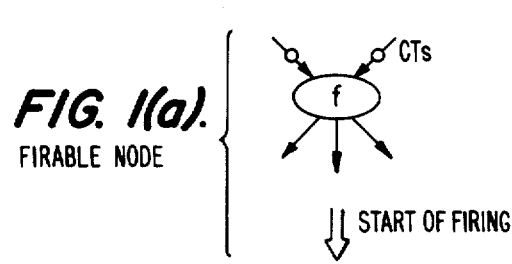
FIGS. 1(a)–1(d) represent the flow of the control tokens according to the present invention.
Figure 1B:
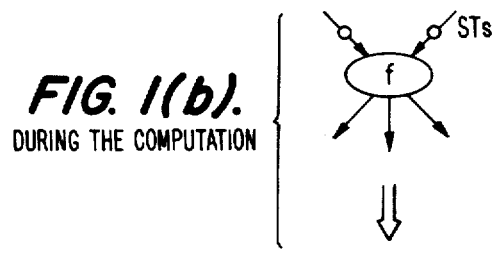
Figure 1C:
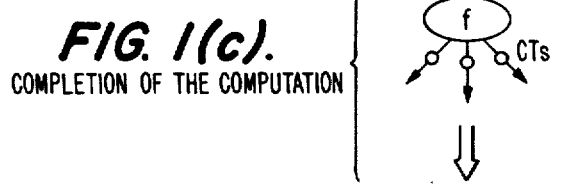
Figure 1D:
Figure 2:
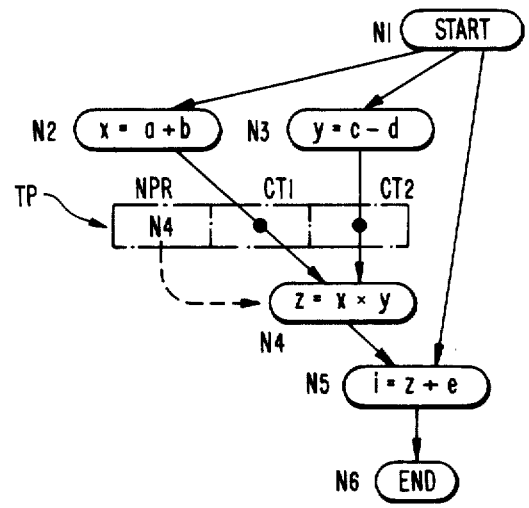
FIG. 2 shows an exemplary control flow program according to the present invention.

FIG. 2 shows an example of a control flow program for calculating $1=(a+b)(c-d)+e$. The program is the same as the corresponding CSPSC flow-chart except for the parallel calculations and control tokens (CT1, CT2). The program and data (a, b, c, d, e and l) without the control tokens are stored in the main memory. This calculation is effected by carrying out the individual calculations:

$$x = a + b,$$

$$y = c - d,$$

$$z = x \cdot y$$

and $$1 = z + e$$

at separate steps, referred to as nodes. In FIG. 2, the nodes or unit processings are represented by ellipses N1 to N6, respectively. The contents of the nodes to be processed are shown within the associated ellipses. The node interconnecting lines with arrows are referred to as the arcs which are classified as incoming (input) and outgoing (output) arcs in dependence on the direction of the attached arrows. The processing at each node is initiated when one or more control tokens (indicated by solid circles in FIG. 2) are present at the associated incoming arc or arcs. Upon completion of the processing at a node being executed, the control token is removed from the incoming arc or arcs of the associated node, while a new control token is put on the outgoing arc or arcs of the node. A combination of a node and the outgoing arc thereof corresponds to an instruction word in a conventional computer. The control token or tokens associated with the arcs of a single node are combined with a node pointer (NPR) indicating the node to which the control token or tokens are to be inputted to thereby constitute a so-called token packet, represented by TP. This token packet is then stored in a node drive register NDR. It is to be noted that execution of the processing at the node is also referred to as the execution of that node. In the case of the program shown in FIG. 1, execution of the node N1 is followed by execution of the nodes N2 and N3. Subsequently, the node N4 is executed, which is followed by executions of the node N5 and thence node N6. It is not previously determined by the program which of the nodes N2 and N3 is to be executed first. The sequence of execution of these nodes N2 and N3 is determined at the time of execution.

ORGANIZATION OF A CONTROL FLOW PARALLEL COMPUTER

Figure 3:
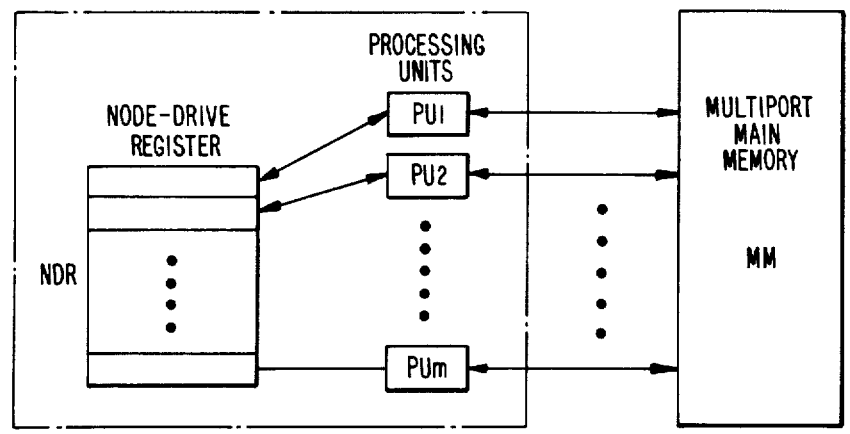
FIG. 3 shows the basic organization of a control flow computer according to the present invention.
Figure 4:
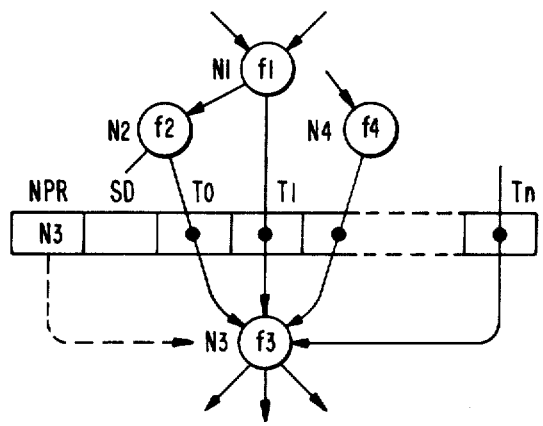
FIG. 4 shows the basic format of a token packet.

The organization of a control flow parallel computer (CFPC) is shown in FIG. 3. The architecture is fundamentally that of a CSPSC. However, a node-drive register (NDR), plural processing units (PUs) and a multiport main memory (MM) are used instead of a program counter, one processing unit and conventional main memory, respectively. The NDR stores the control tokens, the shell tokens and the result tokens as so-called control token pakcets (CTPs), shell token packets (STPs) and result token packets (RTPs), respectively. Those token packets (TPs) consist of a node pointer (NPR), status data (SD) and tokens (To ... Tn) which will be sent to the node indicated by the NPR, as shown in FIG. 4. A control token packet containing all the necessary control tokens is called a COMPLETE CONTROL TOKEN PACKET (CCTP). The SD is used to indicate whether the CTP, STP and RTP. A multi-port main memory (MM) stores control flow programs and data, and corresponds to the main memory of a CSPSC.

Figure 5:
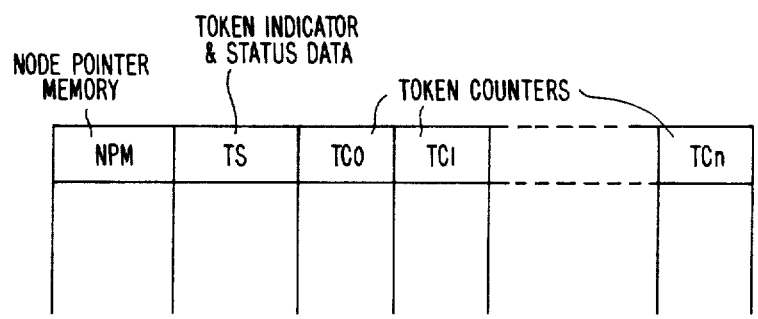
FIG. 5 shows the organization of a word of a node drive register storing the token packet of FIG. 4.

The NDR consists of a NODE POINTER MEMORY (NPM), a TOKEN INDICATOR & STATUS DATA (TS) and TOKEN COUNTERS (TCo ... TCn) as shown in FIG. 5. The NPM and the TCs in a word of the NDR store the node pointer NPR and tokens of the token packet, respectively. Each TC is a counter which is incremented or decremented to indicate the storage or removal of a token, respectively. The TS stores the SD of a token packet and the status of the word. The NDR is an associative and multiport memory to be accessed through each of the node pointers by plural processing units simultaneously.

Figure 6:
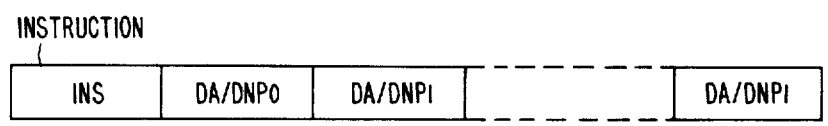
FIG. 6 shows the basic format of a node packet.

A CFPC program is stored as a set of so called NODE PACKETS (NPs) in the multi-port main memory. The NP consists of an INSTRUCTION or a FUNCTION (INS) and DATA ADDRESS(es) or DESTINATION NODE POINTER(s) (DA/DNPo .. . DA/DNP1) as shown in FIG. 6. The data address DA is a memory address into or from which data is written or read. The destination node pointer DNP is a linkage to the next node packet (NP) which is to be executed after the completion of the firing of the node. After starting of an NP-firing, the data denoted by the read-from DA(es) is(are) processed by the PU, and the result(s) is(are) written in the word(s) of the MM denoted by the write-into DA(es). Then the control token(s) is(are) sent to the NDR as CTP(s) using the DNP(s).

EXECUTION PROCESS

Figure 7:
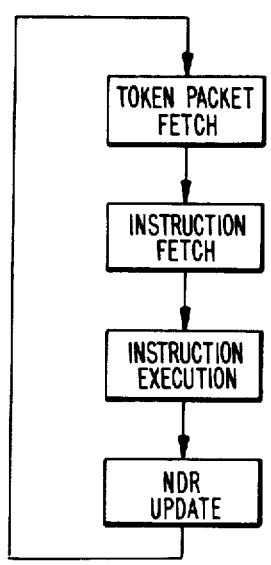
FIG. 7 is a flow diagram showing the execution process of a control flow computer according to the present invention.

The execution process of a CFPC is essentially the same as that of the CSPSCs. The execution of a node or an instruction (FIG. 7) is divided into four stages: token packet fetch process, instruction fetch process, instruction execution process and NDR update process.

The following is a detailed execution algorithm for the architecture.

TOKEN PACKET FETCH PROCESS

1. A PU reads a CCTP, if there is any, from the NDR and writes a code indicating "STP" in place of a code indicating "CCTP" in the SD. Otherwise, the PU goes to step 1.

INSTRUCTION FETCH PROCESS

2. The PU fetches from MM the NP pointed by the NPR of the CCTP read in step 1, as well as the data for executing the fetched NP.

EXECUTION PROCESS

3. The PU executes the corresponding instruction or function of the NP.

NDR UPDATE PROCESS

4. After completion of the execution, the PU creates new CTPs by combining a CT with each of the DNPs in the NP fetched in step 2, and sends them to the NDR. This corresponds to the placing of the control token on the output or outgoing arc of the executed node.

5. The PU sends a delete signal for the STP to the NDR.

6. When the NDR receives the new CTP from the PU, the NDR checks for CTPs, which were already stored, with the value of the NPR equal to that of the new CTP.

7. If there is one, the NDR increments the TCs associated with the control tokens in the new CTP to be stored. With reference to FIG. 5, this means that an associated $TC_i$ (where i has a value of o to n) of the NDR word having the same value of its NPR is incremented by 1 for each CT sent to that CTP. If not, the NDR stores the new CTP in a vacant word of the NDR. In this manner, the CT's for the same node are collected in a set.

8. When the NDR receives the delete signal for the STP in step 5, the NDR removes the STP, then decrements all TCs of the word of the NDR in which the STP was stored when all control token packets (CTP's) have been sent out to the word or words storing the CTP's of the next node or nodes. The fact that all CTP's have been sent out to the word or words associated with the next node or nodes can be indicated in a conventional manner such as by setting a flag. At this time, the value of each TC of the executed word in the NDR through $TC_j$ is decreased by 1. The variable j is determined based on the node which was executed and is equal to the number of input arcs to that node. Operation then returns to step 1.

In case the values of all TCs become zero in step 8, the word in which the STP has been stored becomes vacant. On the other hand an overflow of any TC may occur during step 7, thus, the PU is informed by means of an interrupt. Such overflow implies an unsafe execution. The PU receiving the interrupt changes the STP into an RTP and writes the CTP(s), which it could not send to the NDR for the next nodes, in the RTP. The sending of a result token resumes when the RTP is read in step 1 after such overflow ceases. That is, the PU begins the process from step 4 onwards and the PU sends a delete signal for the RTP instead of one for an STP in step 5.

The steps mentioned above are performed for each of the processors so that a plurality of the control token packets are read out for executing a plurality of nodes simultaneously.

REDUCTION OF COMPLEXITY OF THE MULTIPORT MAIN MEMORY

Figure 8:
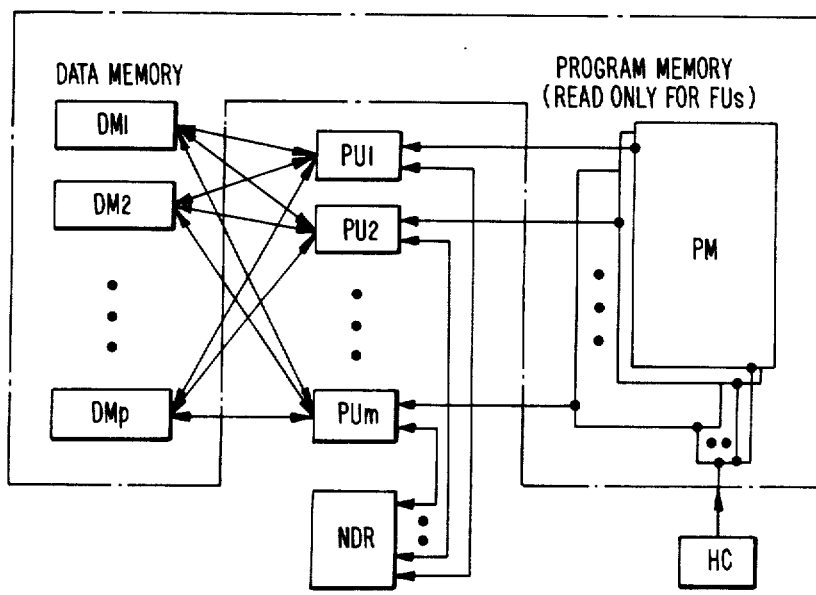
FIG. 8 shows a simplification of the main memory of a control flow computer according to the present invention.

The complexity of the multiport main memory MM can be reduced if the memory is divided into two parts, a program memory (PM) and a data memory (DM), as shown in FIG. 8. The PM is a conventional memory which holds the control flow program, and is duplicated for each PU. Therefore the PM is a read-only memory for the PUs and is a write only memory for a host computer (HC) which writes control flow programs in it. The DM is also conventional memory and is divided into more than m banks to make a shared memory (M is the number of PUs). A mutually exclusive control for each bank should be implemented but can be relatively small in size because the minimum number of required banks to avoid data memory contentions is the number of PUs.

CONTROL FLOW PROCESSING AND DATA FLOW PROCESSING

In the data flow processing, data referred to as a data token flows during execution of a program. In contrast, in the case of the control flow processing as discussed above, a token indicative of the "control of execution" which is termed a "control token" (CT) is made use of. The phrase "control of execution" is intended to mean "permission to proceed with the execution of processing" in that only upon the arrival of a CT at a PU is the associated processing allowed to be initiated. It should be noted that in the case of data flow processing, data represent values to be processed and at the same time serve the function of the CT i.e., the control of execution.

In control flow processing, the program must be so prepared that upon the arrival of the CT at a given node, correct data for the execution of the instruction placed in that node must be ready to be used. Otherwise, there may arise a situation in which execution of an instruction initiated upon the arrival of the CT is performed on the basis of incorrect or improper data located at the memory addresses designated by the instruction, producing erroneous results. Such an undesirable possibility is excluded in the case of data flow processing, because data themselves are supplied. However, in that case, the data must necessarily be prepared by the immediately preceding node. In contrast, in the case of control flow processing, data may be prepared at any nodes so far as they are located upstream of the node to be executed. In this sense, it can be said that control flow processing has no direct dependence on the data.

Data flow processing belongs to a data-based processing in which data are fetched, and processing is performed on the data, whereby new data is outputted while the old data is discarded. Accordingly, processing of data of scalar values can be performed with high efficiency because the transfer of data can be carried out simultaneously with the control of execution. However, processing concerning the structure of data cannot be performed efficiently. For example, suppose that data of a large structure is fetched and modification is to be made on a small part of the data. In this case, the whole data structure has to be fetched, which means considerable degradation in operating efficiency. To deal with this problem, data manipulation is effected by resorting to the use of a pointer and a reference count. Nevertheless, difficulty is encountered in solving the problem of the poor efficiency in the processing of the data structure because the single data structure can not be processed in parallel owing to inability to provide simultaneous executions in data flow processing. In this connection, it should be mentioned that control flow processing is designed in principle to permit access to data for reference on the premise that the data are usually to be modified or altered. Accordingly, there is no necessity for fetching the whole structure of data for modification of a part thereof. Besides, parallel processings can be realized on a single data structure in a facilitated manner.

By way of example, it is assumed that the data structure shown in FIG. 9(a) is to be modified to the data structure shown at 9(b) by additionally adding a3 and a4. In this case, parallel processing can be carried out in a manner illustrated at 9(c) in the case of control flow processing. In contrast, in the case of the data flow processing, parallel processing such as shown at 9(d) can not be performed. More specifically, according to data flow processing, there are produced a pair of discrete data in which one data is composed of the data structure shown at 9(a) added with a3 and the other data include the data structure 9(a) plus a4, and the data structure shown at 9(b) can not straightforwardly be produced. Thus, in data flow processing in its intrinsic sense, the structure shown at 9(b) can be produced only through serial processing in which the data structure shown at 9(a) is first added with a3, being followed by the addition of a4.

TRANSFORMATION OF DATA FLOW PROGRAM TO CONTROL FLOW PROGRAM

Data flow processing may be regarded as control flow processing added with dependences among data. Accordingly, transformation of a data flow program into a control flow program can be realized relatively easily. In other words, the data flow program can be executed by using a control flow computer with the characteristic features of the data flow program being retained. By way of example, there is illustrated in FIG. 10(a) a data flow program for executing the calculation $d=(ab+ac)(a-b)$ according to a single assignment or allocation rule. This data flow program can be transformed into a control flow program by adding the token destination node identifiers N1, N2, ..., N5 representing the nodes to which the tokens are destined to be sent after execution of instruction, as is illustrated in FIG. 10(b). In this figure, a symbol N4. 2, for example, designates the second arc of the node N4. Since the data flow program shown in FIG. 10(a) is inherently of such nature that no secondary effects are produced, the control flow program resulting from the transformation is also accompanied with no subsidiary effects. In other words, the program accompanied with no subsidiary effect can be executed through the transformation of the data flow program to the control flow program.

ALTERNATE COMPUTER ARCHITECTURE

Figure 11A:
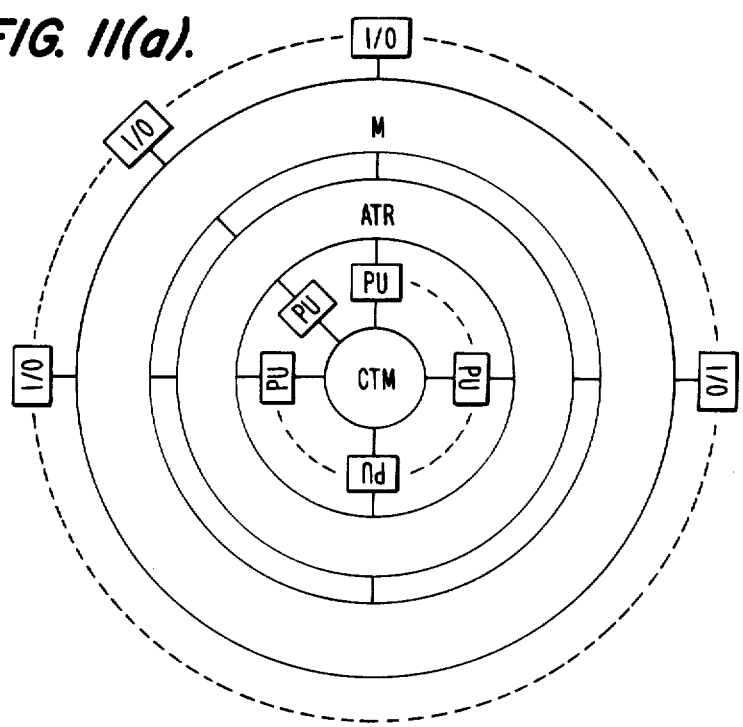
FIG. 11(a) shows an alternate embodiment of a control flow computer architecture according to the present invention.

A variation of the architecture of a control flow computer is schematically shown in FIG. 11(a), in which reference symbol CTM denotes a control token memory, PU denotes a Processor Unit, I/O denotes input/output (I/O) interfaces, m denotes the main memory, and ATR denotes an address translation register. The control token memory CTM serves for storage of tokens, and the memory M serves for storing the program as a set of nodes and data. The processing is of course executed by the processor PU.

In a parallel processing computer, there may arise such a situation in which a procedure is called by a plurality of routines. In this case, competition or collision of the calls or requests may be evaded by preparing a number of copies of the procedure equal to that of the requests or by applying discriminating colors to the tokens and the variables included in the procedure as requested. Since the preparation of copies is expensive and time-consuming, a coloration method is adopted. The address translation register ATR is provided to this end.

Figure 11B:
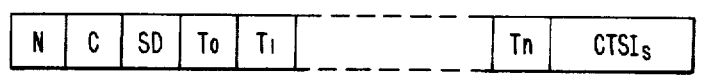
FIG. 11(b) shows the format of a token packet to be used with the architecture of FIG. 11(a)

Those tokens which are to be inputted to a given node are combined in a set which is then attached with a pointer indicative of the node to which the tokens are to be supplied, to thereby constitute the token packet (TP) shown in FIG. 11(b), where N represents the node address which is the name or identifier of the node to which the token packet is to be inputted, also called the node packet, corresponding to this TP, as discussed above. By means of the color indicator (C), simultaneous or successive invocations of the same subroutine may be performed. Status data (SD) contains information about the state of the CTP as discussed above as follows:

1. Whether the TP is being used or not. If it is being used it is indicated as a control token packet (CTP).
2. If being used, does it contain all the necessary control tokens already?. In the former case it is said to be a CCTP, an acronym for complete control token packet.
3. Being a CCTP, is the corresponding instruction being executed or not?. If the instruction is being executed, the TP is indicated as being a shell token packet (STP).
4. In case a CCTP has been executed already but some of its output control tokens are not yet issued due to an unsafe condition, such CCTP is newly dubbed as a result token packet (RTP).

Figure 11C:
FIG. 11(c) shows the format of a node packet to be used with the architecture of FIG. 11(a)

The tokens are represented by To ... Tn. These indicators are set to 1 if the corresponding control token is available or a dummy, otherwise the corresponding indicator is set to 0. Therefore, the completeness of a CTP can be determined by the logical AND of the indicators To ... Tn. The CTSIs are control token sent indicators. These indicators show that the corresponding destinations have received an output token if they are set to 1, otherwise they contain an O. The node is expressed in terms of a node packet, as shown in FIG. 11(c), where INS represents an instruction, OP1, OP2 and OP3 represent operands and DES1 to DESM represent destinations of the tokens, each consisting of a node name or identifier N and the identifying number of an input arc. The operands and destinations are the same as discussed above relative to indicators DA/DNP of FIG. 6. The node packet is stored in the memory M. The operands OP1 and OP2 designate primarily the data to be processed or the memory addresses at which the data are placed, and OP3 designates the memory address at which the result is to be stored. Further, DES1 to DESM are used for controlling the order or sequence in which the processing is executed.

The memory M and the address translation register ATR are, respectively, constituted by multi-port memories of an interleaved type, while the control token memory CTM is an associative multi-port memory. Since a CT may be of a single bit, the control token memory CTM can be implemented in a simplified configuration. The CTM is equivalent to the NDR discussed above.

In the control flow computer, a program is executed in the following manner:

1. The processor reads out a complete token packet CCTP from the token memory.
2. Subsequently, a node packet designated by the node name N of the complete token packet CCTP as read is read out from the memory.
3. The processor reads out the data designated by the color C of the token packet and the operands OP1 and OP2 from the memory, to execute an instruction, the result of execution being stored at the memory address designated by C and OP3 of the node packet.

4. The processor combines a CT with the node name designated by DES1... DESM of the node packet and the color attached to the complete node packet, the resultant combination being sent to the token memory as a token packet. Those token packets which include the same node identifier or name and color are assembled in one set in the form given by the expression of FIG. 11(b) to be stored as one word in the token memory.

The steps 1 to 4 mentioned above are executed by each of the processors so that the program can be executed in parallel.

Figure 12:
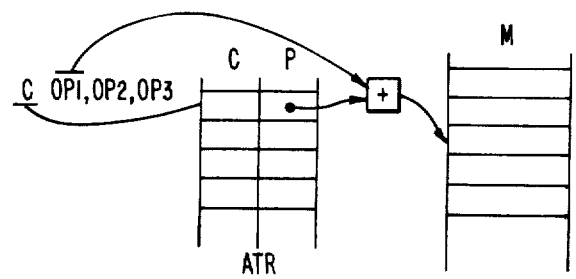
FIG. 12 depicts the designation of memory locations using a color indicator.

Determination of the address at the step 3 is carried out in the manner illustrated in FIG. 12 with the aid of an address translation table stored in the ATR. More specifically, the address translation table contains color data C and associated pointers P, an effective address is determined by adding the pointer P from the address translation table with OP1, OP2 or OP3. The colors are unique in the whole computer system. The value or content of the pointer is written by a memory manager when the procedure is called, as explained in the following section.

PROCEDURE CALL

Figure 13:
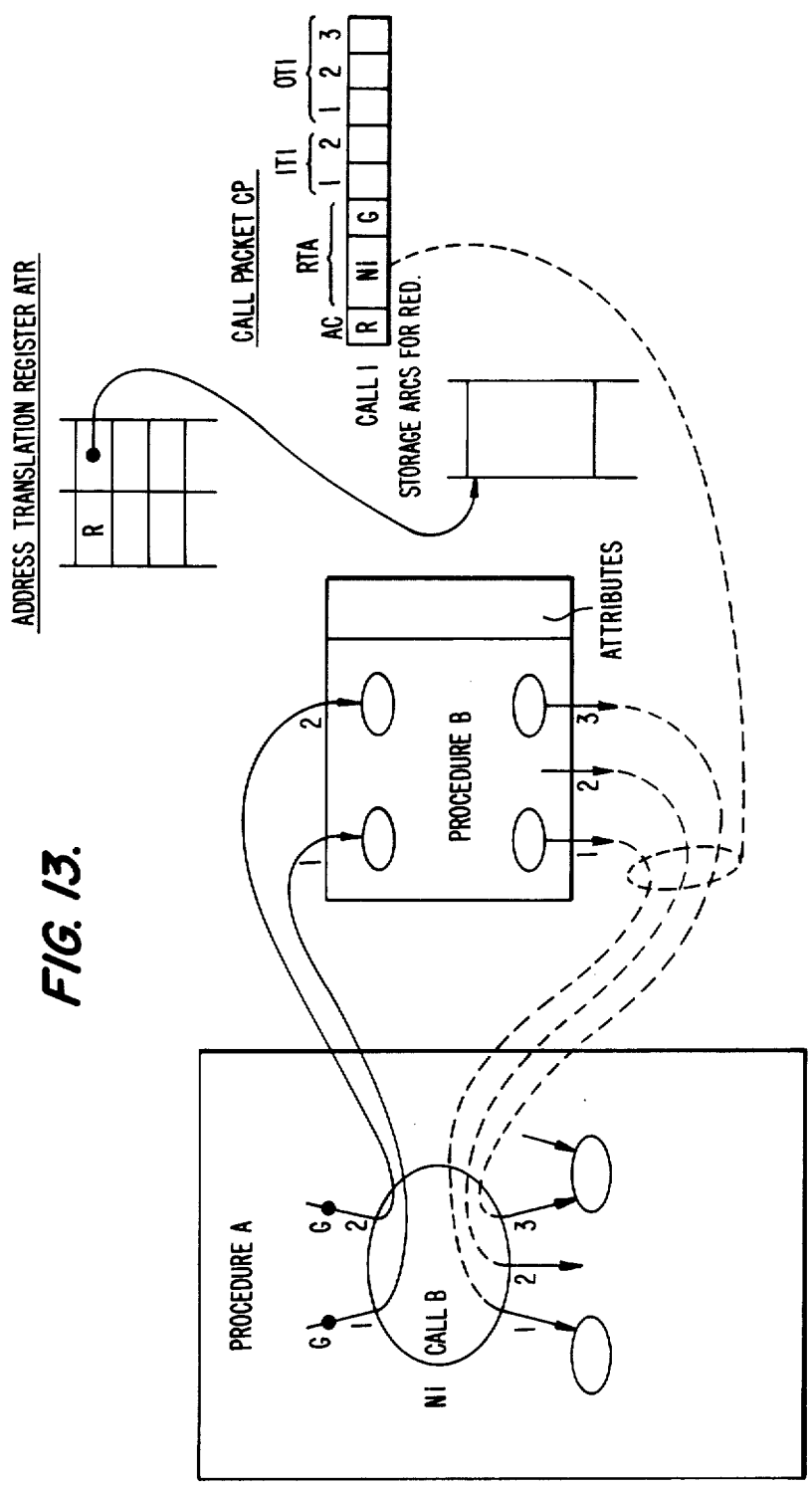
FIG. 13 shows the procedure call operation.

The procedure call is performed in the manner illustrated in FIG. 13 by making use of a call packet and colored token. FIG. 13 shows the instantaneous state at the moment the procedure B is called by a procedure call node $N_i$ included in the procedure A. The execution of a procedure call node is initiated only when a token makes an appearance on two or more input arcs thereof. Upon initiation of execution of the procedure call node, the call packet CP is prepared, wherein a color corresponding to the call is allocated to the token and the variables. In the case of the illustrated example, execution of the procedure call node $N_i$ is initiated in response to tokens assigned the color "green (G)", while red (R) is allocated to the tokens and the variables included in the called procedure. Hereafter, the execution of the procedure B at the procedure call node is under the control of the red tokens. Allocation of color to the variables is accomplished through the assignment of a new variable area or field to the procedure and writing of the pointer of the address translation register in the variable field. The call packet CP is composed of an allocated color area AC, a return address area RTA, an input token indicator area ITI and an output token indicator area OT1. The return address area RTA consists of the call node name and the token color which caused initiation of the procedure call (in the illustrated case, RTA consists of $N_i$ and green G). Destination of the token(s) outputted from the procedure B is determined as a function of $N_i$ and the identifying number(s) of the output arc(s), of that procedure. For example, for the second output arc, the destination of the outputted token is determined in accordance with $f(N_i, 2)$. The input (or output) token indicator ITI (or OTI) indicates whether the tokens are inputted (or outputted) to (or from) the associated arcs. When all the input arcs have received tokens and when tokens are outputted to all the output arcs, this means that the execution of the procedure has come to an end. The color of the outputted tokens is restored to the original color, i.e., green (G). Then, the call packet and the variable area allocated to the procedure call disappear. Information concerning the size of the variable area and the like is stored in an attribute area added to the procedure.

A discussion of the use of call packets in data flow computers is set forth in the article "Subroutine Implementation in DFNDR-Data Flow Computer," by Sowa, M. and Ramos, F. D., Shin Academy, Electronic Computer Studies Data, EC 33-16, July, 1983, which is incorporated herein by reference.

NEUMAN TYPE PROCESSING EXECUTING MECHANISM

Figure 14:
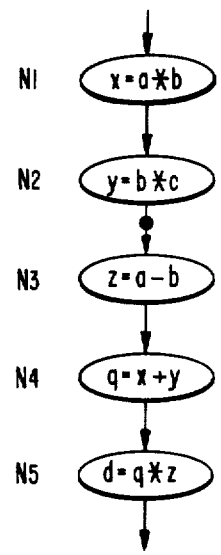
FIG. 14 shows a Neumann processing program.

FIG. 14 illustrates a special case of control flow processing in which the processing is executed only in series or sequence. For executing serial processing, the following conditions are to be additionally satisfied.

(1) The processor for executing a sequence of serial programs is fixed to a particular one.

(2) The node packets (instructions) to be executed are stored in the order of execution as far as possible.

(3) One word of the control token memory CTM is allocated for use only by the processor.

On these conditions, execution can be simplified as discussed below.

On the above condition (1), data transfer can be performed between adjacent nodes through the processor, whereby processing speed can be increased as compared with the case where the memory intervenes in the processing. On the condition (2), the node packet to be executed next can be detected on the basis of the length of the node packet being currently executed. Consequently, the names of the nodes (DES, ..., DESM) to which a token is to be subsequently sent can be omitted from the node packet so far as the order of execution corresponds to the queue order. Otherwise, the node name can not be omitted. In serial processing, one of the nodes is always in a state ready for execution. Accordingly, one token is always present in the processor-only word in the token memory due to this condition. Thus, the token can be omitted. For realizing the characteristic features mentioned above, an accumulator and/or a general-purpose register for storing interim results may be incorporated in the processor Further, when the instruction i included in a node packet commands serial processing, the one word of the token memory may be allocated as a program counter to the processor which has fetched the associated node. In this way, Neumann type processing can be executed. The Neumann type processing may be carried out by additionally allocating a program counter PC to each of the processors in place of allocating the processor-only one word of the token memory.

Figure 15B:
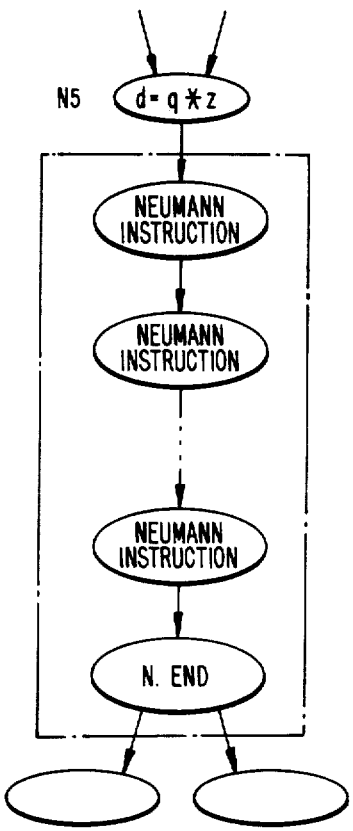
FIG. 15(b) is a flow diagram showing a Neumann program contained within a control flow program.
Figure 15A:
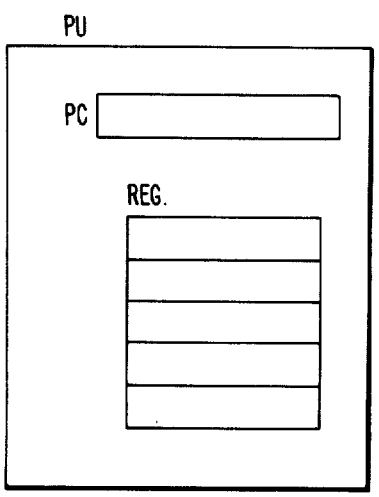
FIG. 15(a) shows a variation of the control flow architecture for executing a Neumann program.

By way of example, when a program counter PC is provided within the processor, the processor for the control flow computer capable of executing a Neuman program may be configured as shown in FIG. 15 at (a), and the Neuman program may be in the form shown at (b). In FIG. 15(a), "Reg." denotes a generalpurpose register, and PC denotes a program counter. In FIG. 13(b) N.END represents the end of the Neuman processing. Thus, Neuman serial processing can be accomplished at increased speed by virtue of the fact that detection of the node next to be executed is facilitated.

CONTROL FLOW PROGRAMMING

Figure 16A:
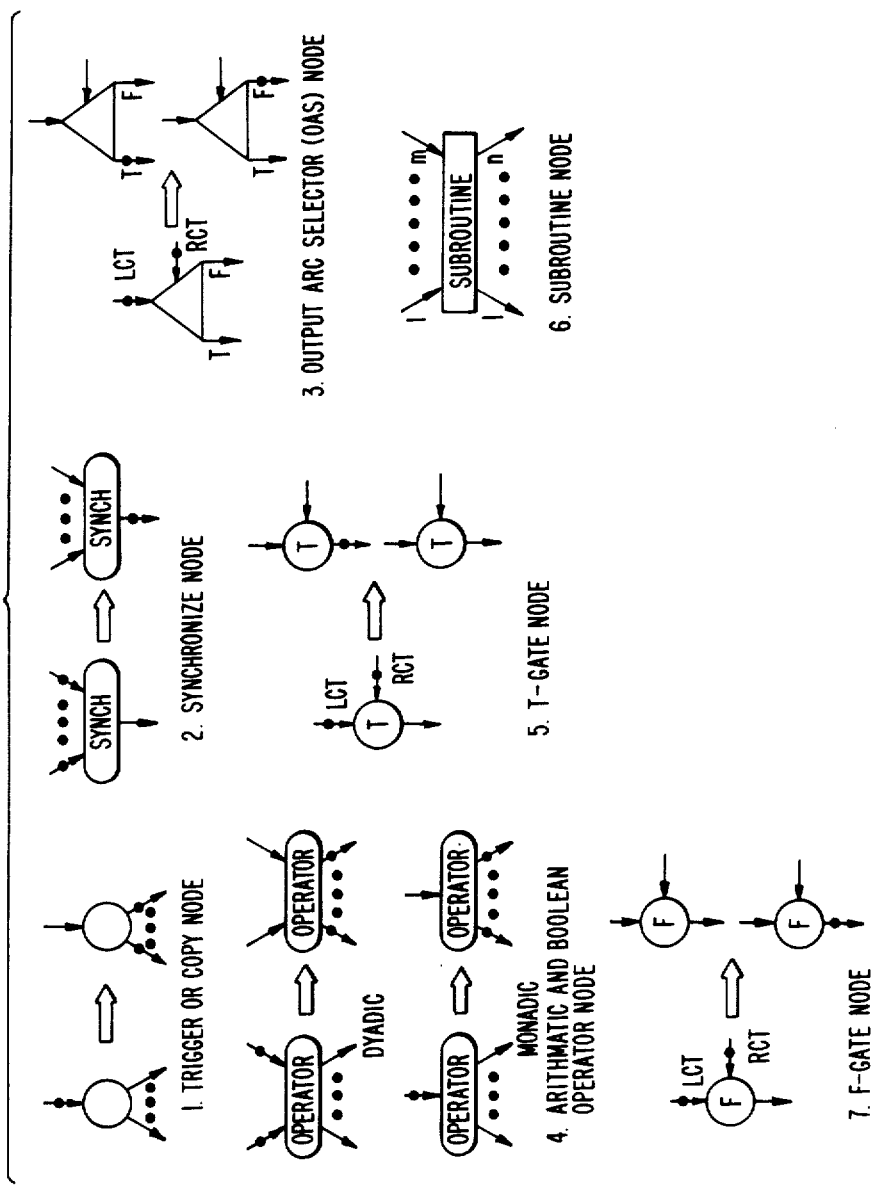
FIGS. 16(a) and 16(b) show Dennis nodes.

A program is written in a control flow language which is a collection of nodes almost similar to those defined by Dennis (see FIG. 16). Control flow nodes and their firing rules are shown in FIG. 16. With the exception of a subroutine node, a node becomes executable if all the needed control tokens are available. The principle of a by availability control mechanism seems to be not suitable in the case of a subroutine node because it is actually an aggregate of the previously stated fundamental nodes. Therefore, an arrival of at least one control token may result in fireability of some fundamental nodes.

The articles "First Version of a Data Flow Procedure Language" by Dennis, J. B., Proceedings of the Symposium on Programming, University of Paris, April 1974, and "A Preliminary Architecture for a Basic Data Flow Porcessor," by Dennis, J. B. and Misiena, D. P. IEEE Proc. on 2nd Annual Symposium on Computer Architecture (1975) provide a background on Dennis nodes and are incorporated herein by reference.

Figure 16B:
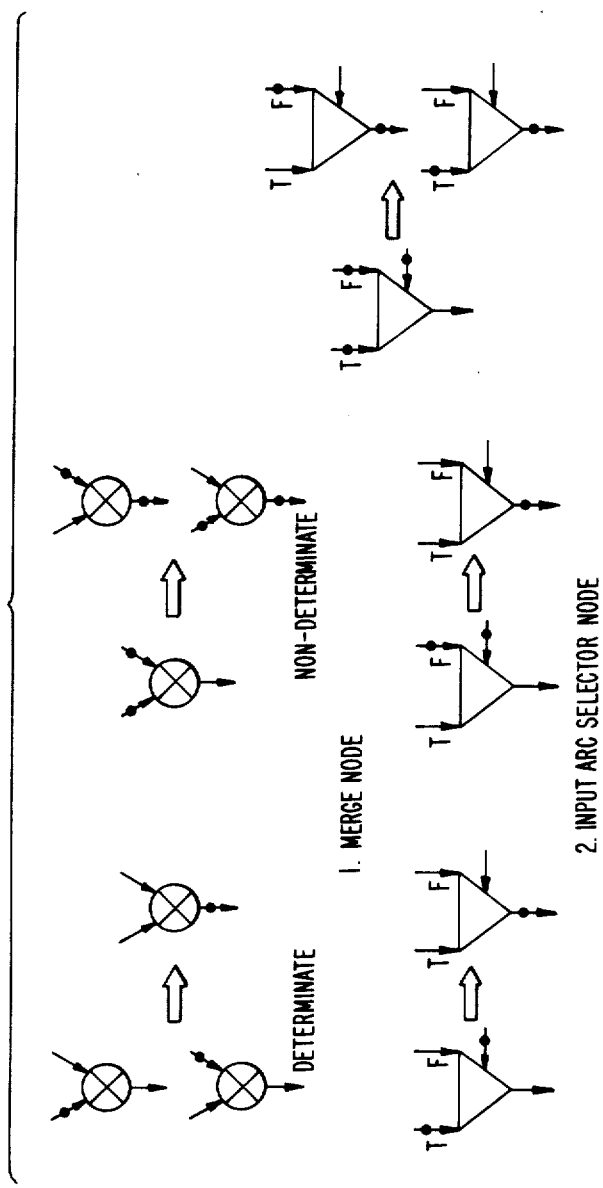

The input arc selector node and merge node (see FIG. 16(b)) need not be used. An input arc selector node will be of importance only when the data corresponding to the control tokens to be selected are both constants. This will be a very rare case and it can be easily shown that an input selector node may be realized by using a pair of T-Gate and F-Gate nodes. The merge node, on the other hand, serves no purpose but to increase the number of nodes used in writing a control flow program thus slowing down its execution. This is because, if a program is accurately written, there is no possibility that a multi-source control arc will have more than one control token at any time for it will result in program non-determinacy.

CONTROL FLOW INSTRUCTION FORMAT

Figures 17, 18A, 18B, 18C, 20A, 20B, 21A, 21B, 22:
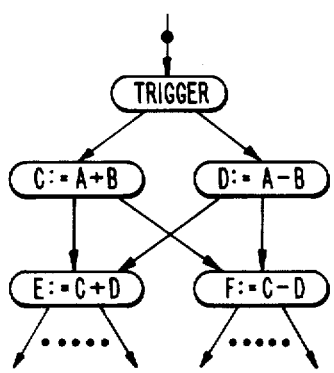
FIG. 17 shows the format of a node packet in greater detail.
FIGS. 18(a)–18(c) show the format of a destination specification of the node packet of FIG. 17.
FIG. 20(a) shows a sample flow chart of a control flow program.
FIG. 20(b) shows an assembly language program for carrying out the flow chart of FIG. 20(a)
FIGS. 21(a) and 21(b) shows formats of control flow statements.
FIG. 22 shows the format of an assembly language subroutine definition for a control flow program.

FIG. 17 illustrates a more detailed format of a control flow instruction or node packet. In this figure, LOS represents the left operand specification, ROS represents the right operand specification, RS represents the rsult specification, ND represents the number of destinations, and DSi represents the $i^{th}$ destination specification. The first two words (at most) contain information about the operation code, operand and result specifications, number of destinations, and destination specification. If existent, a left operand may be immedite data or it may be a memory reference. The latter is classified into absolute, indirect or relative addressing. The right operand specification classification is almost the same as that of the left operand. Nevertheless, when the right operand's address is the same as that of the left operand, it may be specified in that manner so as to minimize the number of memory words occupied by a node packet. Similarly, in case the memory referenced result is the same as that of either left operand or right operand it may be specified so.

The format of the destination specification is shown in FIG. 18(a). If SNI (subroutine node indicator) is equal to 1, the remaining five bits are interpreted as depicted in FIG. 18(b). WCA signifies which control arc will be triggered. If ENT equals 1, that is, the subroutine node will be "entered", the control arc to be triggered is an input one or else it is an output one. The corresponding destination address will be 16-bits long indicating the invoked subroutine number or name. If SNI is 0, the first three remaining bits will be interpreted as in FIG. 18(c) while the last two remaining bits will be unused. Destination addressing type is either absolute or relative but as much as possible relative addressing will be utilized. NCTN represents the number of control tokens needed.

CONTROL FLOW PROGRAM INSTRUCTION SET the instruction set summary of assembly language to be used in control flow programming is shown in FIG. 19. This is based upon that used for an MC68000.

As an illustration, consider the simple control flow program graph of FIG. 20(a). Note that the first two nodes both require one control token only. This is allowable provided that during the arrival of the required control token of the trigger node, valid data have already been stored in addresses A and B. The body of the program as defined in control flow assembly language is shown in FIG. 20(b).

FIG. 21(a) illustrates the general format of a statement. It consists of statement number or label, operation code, operands and result field, and destination field. Copy, synch and trigger nodes do not require operands and result field. The other exception is an OAS node whose destination field is subdivided into TRUE-destination and FALSE-destination. This format is shown in FIG. 8b.

The subroutine definition, as shown in FIG. 22, is similar to that of a conventional assembly language's macro definition. It consists of three parts: header, body and trailer.

SIMULATION RESULTS

Figure 23:
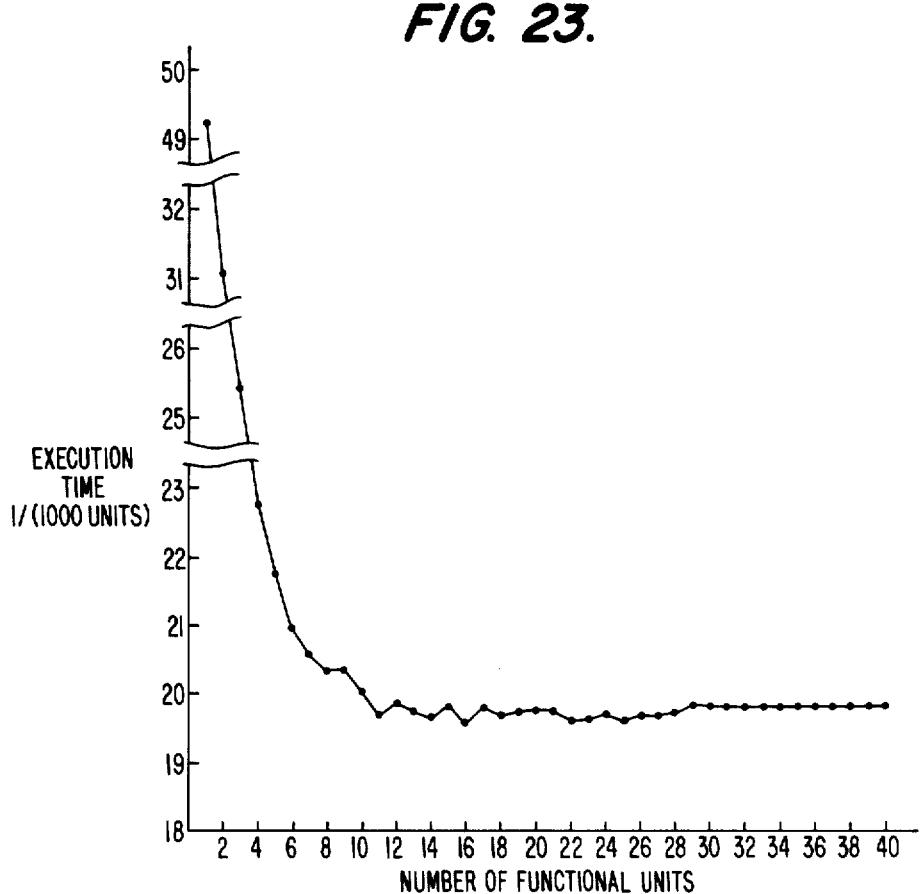
FIG. 23 is a graph showing the number of functional units as the abscissa and execution time as the ordinate and indicating the optimum number of functional units for carrying out a 16 point Fast Fourier Transform using a control flow computer.

Using the previously mentioned control flow assembly language, a 16-point Fast Fourier Transform pattern program is simulated. FIG. 23 shows execution time as a function of the number of functional units. We can see that the execution time stabilizes, that is, there is no apparent improvement, near the point where the number of functional units equals 32. This is due to the fact that, ideally, 16 functional units may be active simultaneously and, 16 more units are required so that soon to be created 16 complete control token packets may be immediately executed. The execution time corresponding to the stability range may not be the minimum due to other factors such as memory contention. However, such discrepancy, if there is, is minimal.

Figure 24:
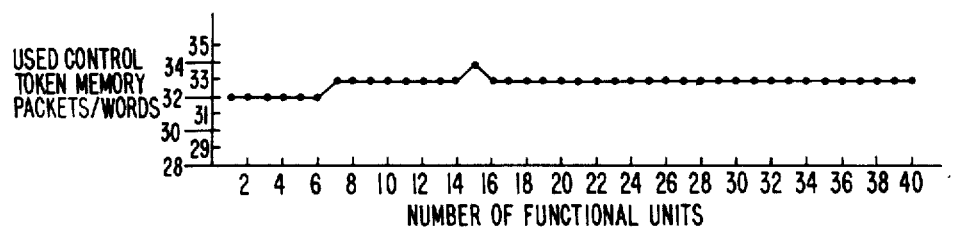
FIG. 24 is a graph showing the number of necessary control token memory words as the ordinate versus the number of functioning units as the abscissa.

FIG. 24 is a plot of the number of needed control token memory (CTM) words versus the number of functional units. In order to avoid deadlock due to shortage of CTM words, the actually needed number of CTM words must be twice the simulation results. This is because control tokens needed for the execution of a certain node packet may be simultaneously created. Hence, they will be written into separate CTPs and then combined. It can be shown that for any program such deadlock will most unlikely occur if the number of CTM words is Dp * (No + 2). Dp is the maximum parallelism of the program and No is the maximum number of output control tokens issued by any node.

SUMMARY

A control flow parallel computer has now been proposed, whose basic structure as well as fundamental operation has been described. Since data and execution control are dealt with separately in the control flow computer, data and control have to be separately commanded by respective instructions. In this respect, the control flow computer is disadvantageous when compared with the data flow computer which is capable of dealing with the data and the control in a set. However, since the order or sequence in which the processings are executed does not directly depend on the attributes of data, the control flow computer can enjoy correspondingly increased flexibility as compared with the data flow computer. Due to this flexibility, a data structure which is difficult to process by a data flow computer can be processed easily by the control flow parallel computer. Of course, the enhanced flexibility in turn may bring about subsidiary effects in the processing itself. Such effect, however, can be avoided by executing the data flow program after transforming it to a control flow program. Since the control flow parallel computer can execute Neumann type processings, this computer can compatibly accommodate an enormous amount of Neuman type processing programs which are currently used. Accordingly, the instant computer provides a bridge between parallel and serial processing.

What is claimed is:

1. A control flow parallel computer system comprising:
   a plurality of processors;
   a main memory means for storing information and having memory locations accessible by said plurality of processors; and
   node drive register means for storing information relating to execution of instructions, said node drive register means being accessible by said plurality of processors, said node drive register means storing a plurality of words, each of said words including a location storing a pointer indicating an instruction to be executed, and a plurality of control token locations for storing control tokens for indicating when the instruction indicated by said pointer is to be executed, each of said control token locations being filled with a control token upon completion of the execution of a prior instruction required to be executed before execution of said instruction indicated by said pointer.

2. A system as set forth in claim 1 wherein each said word also includes a location for storing an indication that all tokens necessary for the instructions indicated by the pointer of that word are being stored, thereby indicating the storage of a complete token packet designating to said processors that the instruction designated by the pointer of that word is ready for execution.

3. A system as set forth in claim 1 wherein said main memory means and said node drive register means are multiport memories available to be accessed by a plurality of said processors simultaneously whereby a plurality of complete token packets are available to be accessed simultaneously and instructions designated by said complete token packets are available to be executed simultaneously.

4. A system as set forth in claim 3 wherein said main memory means comprises a program memory and a data memory.

5. A system as set forth in claim 1 including means for storing said instruction to be executed, said instruction to be executed including an address of an operand needed for execution of said instruction, an address for storing a result of the execution of said instruction, and an address for placing a control token of a word of an instruction to be subsequently examined.

6. A system as set forth in claim 5 wherein each said word contains a location for storing
   an indicator for mapping said operand address and said result address into said main memory, and further including an address translation register for mapping said operand address and said result address into said main memory as a function of said indicator.

7. A method of performing control flow processing using a plurality of processors, a main memory for storing programs and data, and a node drive register, said method comprising:
   establishing a plurality of nodes, each node including an instruction to be executed;
   storing a word for each of said nodes in said node drive register, each word in said node drive register having a location storing a pointer indicating its node and locations for storing controls tokens for its node, a pointer and all control tokens for one node comprising a complete token packet;
   for each of said processors;
   accessing said register and fetching a complete token packet, accessing said main memory and fetching data for executing the node indicated by the pointer of said complete token packet;
   after execution of an instruction of a node, creating a further token packet including a control token and pointer, sending some further token packet to said node drive register means, and storing a control token in each word of the node drive register pointing to a node to be executed subsequently to the executed node.

8. A method as set forth in claim 7 wherein said step of establishing a plurality of nodes comprises, for each node:
   storing a node packet in said main memory, said node packet containing an instruction to be executed, addresses of any operands necessary for carrying out said instruction, an address for storage of a result of said instruction, and addresses of token packets pointing to nodes to be executed subsequently.

9. A method as set forth in claim 8 including storing a color indicator code with each token packet and determining said addresses as a function of said color indicator code.

10. A method as set forth in claim 9 including assigning the same color indicator code to all token packets having a similar instruction.

11. A method as set forth in claim 8 wherein each control token location stores a value indicating the number of tokens being stored and wherein said step of storing a control token comprises incrementing the value of a control token location at each of the words at said addresses of token packets of said node packet.

12. A method as set forth in claim 11 further including, after the step of fetching a complete token packet, placing an indication in the word of the complete token packet which was fetched that the associated node is being executed.

13. A method as set forth in claim 11 including, after said incrementing step, deleting the tokens of the word of the node being executed.

14. A method as set forth in claim 11 including performing serial processing by assigning only 1 control token to each token packet and incrementing only 1 control token after execution of a node.

* * * * *